Patented May 30, 1933

1,911,640

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

REFINING OF HYDROCARBON OIL

No Drawing. Application filed July 22, 1929. Serial No. 380,253.

This invention relates to the treatment of hydrocarbon oils and more particularly to the refining of petroleum distillates, especially that group known as cracked distillates. The invention has for its particular purpose the sweetening of distillates. The term "sweetening" refers to the removal of hydrogen sulfide and/or the removal or conversion of mercaptans.

The presence of hydrogen sulfide and mercaptans in a motor fuel is highly objectionable, not only because of the corrosive effects, particularly of the hydrogen sulfide on the gasoline lines and carburetor parts and from the acids resulting from the combustion of the sulfur compounds, but also because of the highly odoriferous nature of these substances. Ordinarily, hydrogen sulfide can be removed from petroleum distillates by a thorough water-washing alone or in combination with alkalies, such as caustic soda. The removal of mercaptans is a more difficult problem.

The lower molecular weight mercaptans are soluble to some extent in caustic soda or other alkaline solution. The higher molecular weight mercaptans cannot be removed ordinarily by caustic soda. The usual treatment for the removal of mercaptans from petroleum distillates comprises treatment with sodium or potassium plumbite, preferably the former for economic reasons, according to the following reactions:

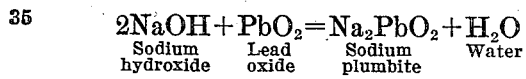

As can be seen from the above reaction, litharge dissolves to a certain extent in a solution of sodium hydroxide to form sodium plumbite. The percent which dissolves is dependent on the concentration of the caustic soda, e. g., a 10% solution of caustic soda will dissolve about 1% of plumbite; a 20% solution will dissolve about 2.5%, etc. It can be seen from this that there is a definite equilibrium set up between the concentration of sodium plumbite and sodium hydroxide.

The sodium plumbite reacts with the mercaptans in the distillate when brought in contact with them, forming lead mercaptides according to the following reaction:

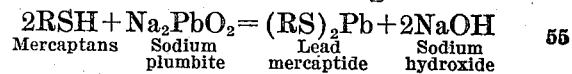

The mercaptides thus formed remain more or less in suspension or solution, a small portion, however, precipitating out. To complete the conversion, elementary sulfur is usually added, whereupon the following reaction occurs:

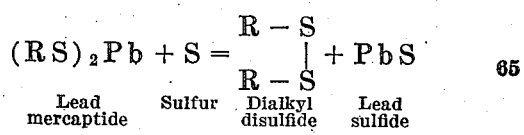

The reactions for the formation of the lead mercaptides are usually carried on in an aqueous medium, and in some cases the higher molecular weight mercaptans do not react readily because of insufficient contact of the dissolved reagents in the aqueous medium and the dissolved mercaptans in the oil.

In the present invention I overcome this objection, and in addition bring about other improvements, such as ease of operation, rapidity of reaction, economy of materials, and saving of losses of the distillates.

In the process which I am about to describe, and which forms the basis of the present invention, I make use of all materials in a solid form, eliminating water. In preparing my reagent I may thoroughly mix a compound of a metal such as lead oxide (litharge), salt of copper, e. g., copper chloride, acetate, nitrate, etcetera, with an accelerating agent such as the hydroxides of the true alkali metals, such as sodium hydroxide, potassium hydroxide, or the like, preferably by melting the hydroxide and distributing the compound of a metal throughout the molten material. In addition to this, I may add to the above mixture oxides of the alkaline earth metals, such as calcium, magnesium, barium, and strontium, or the corresponding carbonates in such relative quantities as not to substantially decrease the rate of reaction, while substantially decreasing the cost and improving the physical condition of the mixture.

To distribute the reagent and have a more suitable form for obtaining close contact with the distillate undergoing treatment, I preferably mix a distributing agent such as various adsorbent materials with the mixture of hydroxide and compound of a metal, or with the mixture of these two substances with the alkaline earths aforementioned. The distributing agent may be of such character as the adsorbent earths, such as fuller's earth, bentonite, bauxite and the various activated clays and other absorbent materials such as chars, or I may add a metallic oxide such as iron oxide, manganese dioxide, or other metallic oxide.

The adsorbent materials are mixed in such proportion as to render the material granular and free filtering.

The mixture of the metallic compound and the hydroxide are preferably prepared first and these in turn are reduced to a finely divided state and thoroughly admixed with the distributing agent. The distillate to be sweetened is simply filtered through the composite material, passing the distillate through a filter column, or a quantity of the sweetening agent in a finely divided state may be agitated with the distillate and later removed by filtration through a suitable filter such as a rotary filter or filter press of any conventional type.

It is not known whether the metallic compound reacts with the hydroxide, but at any rate the sweetening reaction proceeds, the mercaptides being formed when the distillates are filtered through the mixture. The fuller's earth or other adsorbent plays a part in removing a portion or all of the mercaptides, depending upon the nature of the mercaptans present.

With most types of mercaptans, however, it is necessary to have a small percentage of sulfur present to cause the conversion of the mercaptides to the corresponding disulfides. This sulfur may be present originally in the petroleum distillate or it may be added in regulated proportions to the petroleum distillate before or after treating with the sweetening agent, or even to the solid treating mixture. The adsorbent also has a tendency to remove some coloring matter or color-forming material from the distillate, and also to stabilize the color of the distillate which may be adversely affected by excess sulfur.

The metallic sulfides which are formed play some role in promoting the reaction; the extent to which they do this, however, has not been determined. After the material has been used up, i. e., when the sweetening reaction no longer occurs, the whole mass may be mixed with water, heated and blown with air. Under these conditions the metallic sulfides are converted to sulfates and oxides and may be recovered and then incorporated with more of the sweetening mixture, dried and reused. Less of the metal compound need be used in the recovered material.

As a specific example of the process, a mixture comprising approximately two parts of litharge and approximately four parts of caustic soda may be made, thoroughly ground, and then added to approximately six parts of fuller's earth. In making this mixture a paste can be made of the components and then after thoroughly mixing may be dried. The mixture is then granulated and is ready for filtration. A distillate which is distinctly sour to the doctor test may be rapidly sweetened by simple filtration through this mixture.

Various distillates, both straight-run and cracked, including those from Panhandle, Muskegon, Smackover, and other sour crudes, will be readily sweetened by passing through the reagent, in some cases requiring the addition of a small amount of elementary sulfur, and in all cases showing an improvement in color. Good results will be obtained with pressure distillate, e. g., 54° Baumé gravity distillate containing approximately 80% of gasoline, and also with end-point gasolines, i. e., a hydrocarbon distillate of motor fuel boiling range.

When approximately two parts of lime are substituted for two parts of caustic, i. e., using a mixture containing approximately two parts of litharge, two parts of lime, two parts of caustic, and six parts of fuller's earth, very good results will be obtained in sweetening the above distillates.

Eliminating the caustic and using approximately four parts of lime will not give as rapid sweetening as when the mixture of caustic and lime are used in the sweetening agent.

The above examples are simply cited as examples and not by way of limitation as to the kinds of distillates which can be treated by the process as the reaction is fundamental for all petroleum distillates for removal or conversion of the objectionable mercaptans.

The term "distributing agent" as used in the claims is intended to include the adsorbent materials referred to herein, such as fuller's earth, bentonite, bauxite, various activated clays, chars, or metallic oxides, such as iron oxide, manganese dioxide and other dioxides.

The term "accelerating agent" as used in the claims hereof is intended to include the hydroxides of the true alkali metals, such as sodium hydroxide, potassium hydroxide, or the like, or a mixture containing either or both of these hydroxides with oxides or hydroxides of the alkaline earth metals, such as calcium, magnesium, barium, strontium or the corresponding carbonates.

I claim as my invention:

1. A process for refining hydrocarbon oils which comprises subjecting the same to the action of a solid reagent comprising a copper salt, a hydroxide of a true alkali metal, an oxide of an alkaline earth metal, and a solid adsorbent material.

2. A process for sweetening low boiling point hydrocarbon distillates which comprises filtering the same in liquid state through a filtering medium composed of a solid reagent comprising a copper salt, a hydroxide of a true alkali metal, and a solid adsorbent earth.

In testimony whereof I affix my signature.

JACQUE C. MORRELL.